(No Model.)
C. H. BAGLEY.
DETACHABLE SPOUT FOR CANS.
No. 571,852. Patented Nov. 24, 1896.
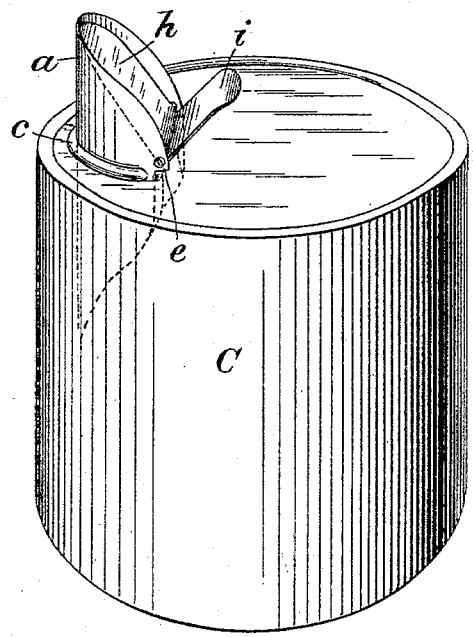
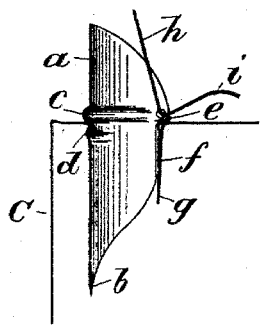
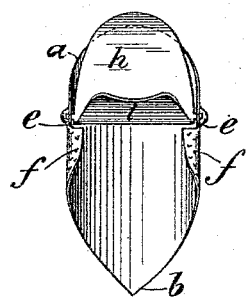
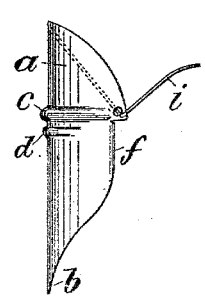
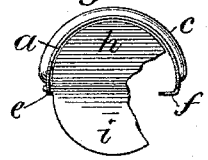
WITNESSES:
L. N. Legendre
Eugenie A. Persides
INVENTOR
Chas. H. Bagley.
BY
A. Faber du Faur.
ATTORNEY

UNITED STATES PATENT OFFICE.

CHARLES H. BAGLEY, OF NEW YORK, N. Y., ASSIGNOR OF ONE-HALF TO HENRY S. PRENTISS, OF ELIZABETH, NEW JERSEY.

DETACHABLE SPOUT FOR CANS.

SPECIFICATION forming part of Letters Patent No. 571,852, dated November 24, 1896.

Application filed November 16, 1895. Serial No. 569,164. (No model.)

*To all whom it may concern:*

Be it known that I, CHARLES H. BAGLEY, a citizen of the United States of America, residing at New York, in the county and State of New York, have invented certain new and useful Improvements in Detachable Spouts for Cans, of which the following is a specification.

My invention has reference to a detachable spout for sealed metallic cans or vessels of that class adapted to be driven into the tops of the cans or vessels for the purpose of removing the liquid contents. Heretofore spouts of this nature have been provided with tubular shells which removed a portion of the top of the can and which portion it was necessary to extract.

The object of my present invention is to provide a spout which can be readily driven into the can without entirely removing any portion of the same, and which is provided with an attached lid for shutting off the outflow of liquid.

To this end I construct the spout with a trough-shaped shell in contradistinction to a tubular shell and provide the same with an attached lid. In connection with the shell I provide suitable means for holding the spout to the can and also taper the cutting-skirt so as to facilitate driving in the spout and to cause the partially-severed portion of the can to be turned downwardly to form an opening for the passage of the liquid.

The nature of my invention will best be understood when described in connection with the accompanying drawings, in which—

Figure 1 represents a perspective view of a can having the improved spout attached. Fig. 2 is a longitudinal section of Fig. 1, part of the can being removed and the lid shown open. Fig. 3 is a rear view of the spout. Fig. 4 is a side view showing the lid closed. Fig. 5 is a plan view of Fig. 4, part being broken away.

Similar letters of reference designate corresponding parts throughout the several views of the drawings.

Referring to the drawings, the letter $a$ designates the shell of the spout, which is made trough-shaped, and, in this example, of substantially a crescent-shaped cross-section at its center. Its lower portion or skirt is sharpened and preferably tapered to a point $b$, so that it can be readily driven into the can C, while at the same time this form causes the tongue or flap $g$, which is cut from the top of the can, to be turned downwardly as the spout is driven in. The upper portion of the shell is formed into a pouring-spout of suitable form. The shell is preferably stamped up from sheet-steel and provided with two peripheral beads $c$ and $d$, extending parallel to each other, and with a shoulder $e$, all of which coöperate to arrest the motion of the spout when it is driven into the can and to hold it to the same. The shoulder $e$ just referred to is formed by cutting the shell and turning inward the two parts $f$, which then form abutments that press against the tongue or flap $g$ cut out from the top of the can. This tongue $g$ as it is automatically turned downward falls behind the abutment $f$ when the spout is driven into the can. The outer faces of the abutments may be serrated or roughened for obtaining an additional hold on the tongue $g$, thereby more firmly securing the spout to the can. To the shell and above the line of the can is hinged a lid $h$, which falls obliquely across the mouth of the spout to close the same. It is manipulated by a finger-piece $i$, extended outwardly from the lid $h$ and preferably made integral with the same by suitably stamping up.

I do not herein broadly claim a detachable spout adapted to be driven into a can for removing its contents, the same being old and well known.

What I claim as new is—

1. A detachable spout for metallic vessels, made trough shape and provided with an upper, tapered pouring-spout and a lower cutting-skirt tapered to a point and having intermediate shoulders $e$, and a peripheral bead or projection, substantially as described.

2. A detachable spout for metallic vessels made trough shape and provided with an upper pouring-spout and a lower cutting-skirt, and a hinged lid adapted to fall obliquely across the mouth of the spout, substantially as described.

3. A detachable spout for metallic vessels made trough shape and provided with an upper pouring-spout and a lower cutting-skirt, two peripheral beads or projections, shoulders $e$, and lateral abutments $f$, substantially as described.

In testimony that I claim the foregoing as my invention I have signed my name in presence of two subscribing witnesses.

CHARLES H. BAGLEY.

Witnesses:
 EUGENIE A. PERSIDES,
 A. FABER DU FAUR, Jr.